United States Patent
Shintani

(10) Patent No.: US 8,773,541 B2
(45) Date of Patent: *Jul. 8, 2014

(54) IMAGE PROCESSING APPARATUS AND METHOD

(71) Applicant: Canon Kabushiki Kaisha, Tokyo (JP)

(72) Inventor: Takuya Shintani, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/151,510

(22) Filed: Jan. 9, 2014

(65) Prior Publication Data

US 2014/0125843 A1  May 8, 2014

Related U.S. Application Data

(63) Continuation of application No. 13/764,227, filed on Feb. 11, 2013, now Pat. No. 8,648,915, which is a continuation of application No. 12/836,070, filed on Jul. 14, 2010, now Pat. No. 8,466,967.

(30) Foreign Application Priority Data

Aug. 18, 2009  (JP) ................. 2009-189578

(51) Int. Cl.
H04N 5/225 (2006.01)
H04N 5/228 (2006.01)
H04N 5/76 (2006.01)
H04N 5/222 (2006.01)

(52) U.S. Cl.
USPC .................. 348/207.1; 348/207.2; 348/222.1; 348/231.99; 348/231.2; 348/231.9; 348/333.01; 348/333.04

(58) Field of Classification Search
USPC .............. 348/207.99, 207.1, 207.11, 207.2, 348/211.99–211.14, 222.1, 231.99–231.9, 348/333.01–333.12

See application file for complete search history.

(56) References Cited

U.S. PATENT DOCUMENTS

| | | | | |
|---|---|---|---|---|
| 7,486,314 B2 * | 2/2009 | Shibutani | ................. | 348/231.7 |
| 8,077,221 B2 * | 12/2011 | Yoshino et al. | ............ | 348/231.2 |
| 2003/0107654 A1 * | 6/2003 | Ohmura | .................. | 348/207.99 |
| 2005/0134689 A1 * | 6/2005 | Hatanaka | ................. | 348/207.1 |
| 2006/0007485 A1 * | 1/2006 | Miyazaki | ................... | 358/1.15 |
| 2006/0279636 A1 * | 12/2006 | Sasaki | ....................... | 348/207.2 |
| 2007/0195350 A1 * | 8/2007 | Hattori | ........................ | 358/1.13 |
| 2008/0106604 A1 * | 5/2008 | Kojima | ...................... | 348/207.2 |
| 2010/0103287 A1 * | 4/2010 | Oikawa | ................... | 348/231.99 |
| 2010/0125610 A1 * | 5/2010 | Zaffino et al. | ................ | 707/793 |
| 2010/0271491 A1 * | 10/2010 | Yasuda | ....................... | 348/207.1 |
| 2012/0081556 A1 * | 4/2012 | Hwang et al. | .............. | 348/207.1 |

* cited by examiner

Primary Examiner — Michael Osinski
(74) Attorney, Agent, or Firm — Cowan, Liebowitz & Latman, P.C.

(57) ABSTRACT

An image processing apparatus that records image data on a detachable storage medium in a previously set recording format is provided. The apparatus sets the recording format of image data, and determines whether or not a storage medium attached to an attachment unit has a communication function that communicates with a different apparatus than the image processing apparatus. If it is determined that the storage medium has a communication function, and that the recording format of image data that can be transferred by the communication function does not match the recording format that has been set, the apparatus issues a warning.

21 Claims, 8 Drawing Sheets

IMAGE PROCESSING APPARATUS AND METHOD

CROSS-REFERENCE TO RELATED APPLICATIONS

This application is a continuation of application Ser. No. 13/764,227, filed Feb. 11, 2013, which, in turn is a continuation of application Ser. No. 12/836,070, filed Jul. 14, 2010, the entire disclosure of which is hereby incorporated by reference.

BACKGROUND OF THE INVENTION

1. Field of the Invention

The present invention relates to control when recording image data on a storage medium that can be attached to and detached from an image processing apparatus.

2. Description of the Related Art

Conventional common image capturing apparatuses such as digital cameras are equipped with a so-called input/output device that writes data to an external storage medium in order to record a captured image or reads data from an external storage medium to reproduce a recorded image. Recently, image capturing apparatuses that are equipped with a plurality of input/output devices in order to connect a plurality of storage media are also being introduced commercially.

Such image capturing apparatuses include apparatuses in which a setting can be made so as to compress captured image data by a plurality of compression methods to generate image data files, and output the image data file/files that has/have been compressed by any one of or all of the compression methods. Examples of an image data file that is generated include JPEG image data that can be handled by many common applications, and so-called RAW image data that is not processed on the image capturing apparatus in order to output an image that has been output from an image sensor without degrading the image. In particular, with respect to a RAW image, by recording the RAW image and performing reproduction (development) processing of the image using an external apparatus such as a personal computer, it is possible to obtain high quality prints or realize more advanced image editing that matches the objective of the user. In some cases, a RAW image is compressed by a lossless compression method to reduce the amount of generated data. In order to distinguish this kind of RAW image file from a JPEG image file, generally an extension other than ".jpg" is used for the RAW image file.

Further, according to Japanese Patent Laid-Open No. 2004-159293 and Japanese Patent Laid-Open No. 2003-179857, image capturing apparatuses are disclosed in which, in particular, image data compressed using different compression methods is generated in a single imaging operation, and which can record the image data on a storage medium. With respect to this kind of image capturing apparatus, an image capturing apparatus that allows a user to arbitrarily set the kind of image data file to be recorded on a storage medium is also being introduced commercially (see Japanese Patent Laid-Open No. 2004-159293 and Japanese Patent Laid-Open No. 2003-179857).

An external storage medium that is attached to an image capturing apparatus and is equipped with a communication function and which also has a function that, upon completion of writing of an image data file thereto by the image capturing apparatus, automatically transfers the image data file to a specified communication destination is in practical use. A feature of this kind of storage medium with a communication function is that since communication is performed by control of the storage medium itself, it is not necessary for the image capturing apparatus to perform control related to communication.

However, some external storage media with a communication function have a restriction whereby only specific kinds of data files can be transferred. This restriction is provided because it is considered that it would be a demerit from the viewpoint of the user if all the kinds of data that are written to the storage medium are transferred. One known method of determining the kind of data file is, for example, to determine the extension of the relevant data file.

According to the image capturing apparatuses described in Japanese Patent Laid-Open No. 2004-159293 and Japanese Patent Laid-Open No. 2003-179857, it is possible to record image data that has been compressed by a plurality of compression methods, as described above. When different methods are used to compress image data, generally a different extension is added to the image data file for the respective compression methods. Consequently, even when a user desires to transfer image data, a transfer is not performed unless image data with an extension that can be transferred is recorded in the external storage medium that has a communication function.

More specifically, there is the problem that the load of the user increases because it is necessary for the user to set what kind of image data to record in the storage medium while taking into consideration a combination of factors including whether or not the storage medium has a communication function as well as the kind of extensions of data that can be transferred using the communication function.

SUMMARY OF THE INVENTION

An object of the present invention is to solve all of, or at least one of, the above described problems.

According to one aspect of the present invention, provided is an image processing apparatus that records image data on a storage medium in a recording format that is previously set, comprising: a setting unit that sets a recording format of image data; an attachment unit that attaches a detachable storage medium; a determination unit that determines whether or not a storage medium that is attached to the attachment unit has a communication function that communicates with a different apparatus than the image processing apparatus; and a control unit that controls so as to issue a warning in a case where it is determined that the storage medium has a communication function and a recording format of image data that can be transferred by the communication function and a recording format that has been set by the setting unit do not match.

Further, according to another aspect of the present invention, provided is an image processing method that records image data in a previously set recording format on a storage medium that can be detachably attached to an attachment unit of an image processing apparatus, comprising: a setting step of setting a recording format of image data; a determination step of determining whether or not a storage medium that is attached to the attachment unit has a communication function that communicates with a different apparatus than the image processing apparatus; and a warning step of issuing a warning in a case where it is determined that the storage medium has a communication function and that a recording format of image data that can be transferred by the communication function and a recording format that has been set in the setting step do not match.

Further features of the present invention will become apparent from the following description of exemplary embodiments (with reference to the attached drawings).

DESCRIPTION OF THE EMBODIMENTS

Hereunder, best modes for implementing the present invention are described in detail with reference to the attached drawings.

First Embodiment

Figure 1:
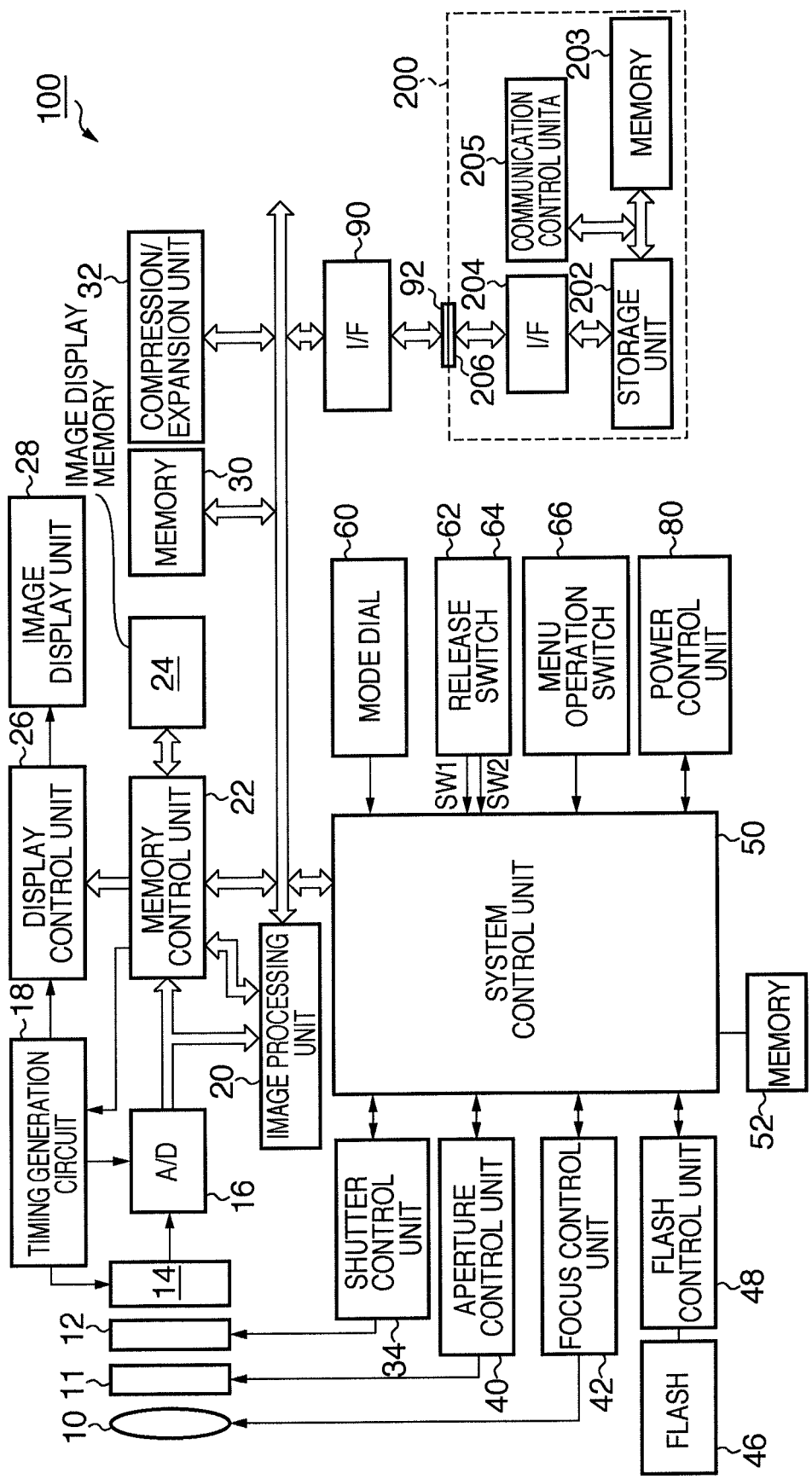
FIG. 1 is a block diagram illustrating a schematic configuration of an image processing apparatus according to a first embodiment.

First, the configuration of an image capturing apparatus according to a first embodiment of the present invention is described referring to FIG. 1.

FIG. 1 is a block diagram illustrating the configuration of an image processing apparatus according to an embodiment of the present invention. A digital camera, a digital video camera, a mobile terminal with camera (including a mobile phone with camera) and the like are available as image processing apparatuses, and it is possible to apply the present invention as long as the apparatus is one that is capable of converting an optical image of a subject to output an electrical image signal. According to the present embodiment, a case is described in which an image processing apparatus 100 is a digital camera.

In FIG. 1, an image processing apparatus 100 includes a photographing lens 10, an aperture 11, a shutter 12, an image sensor 14 that converts an optical image into an electrical signal, and an A/D converter 16 that converts an analog signal output of the image sensor 14 into a digital signal.

A timing generation circuit 18 supplies a clock signal or a control signal to the image sensor 14, the A/D converter 16, and a display control unit 26, respectively. The timing generation circuit 18 is controlled by a memory control unit 22 and a system control unit 50.

An image processing unit 20 performs predetermined pixel interpolation processing or color conversion processing with respect to data from the A/D converter 16 or data from the memory control unit 22, based on processing data added to the image data. The image processing unit 20 also performs predetermined calculation processing using image data output from the A/D converter 16. Based on the obtained calculation result, the system control unit 50 controls auto-focus ($A^F$) processing, automatic exposure (AE) processing, and pre-flash emission (EF) processing according to a through-the-lens (TTL) method. These kinds of processing are performed by the system control unit 50 controlling a shutter control unit 34, an aperture control unit 40, and a focus control unit 42. Further, the image processing unit 20 also performs predetermined calculation processing using image data output from the A/D converter 16, and performs auto-white balance (AWB) processing according to a TTL method based on the obtained calculation result.

The memory control unit 22 controls the A/D converter 16, the timing generation circuit 18, the image processing unit 20, an image display memory 24, the display control unit 26, a memory 30, and a compression/expansion unit 32. Image data output from the A/D converter 16 is written to the image display memory 24 or the memory 30 via the image processing unit 20 and the memory control unit 22 or via only the memory control unit 22.

Reference numeral 24 denotes the image display memory, reference numeral 26 denotes the display control unit, and reference numeral 28 denotes an image display unit comprising a TFT-LCD or the like. Image data for display that is written to the image display memory 24 is displayed by the image display unit 28 via the display control unit 26. An electronic viewfinder (EVF) function can be realized by sequentially displaying captured image data using the image display unit 28. The display of the image display unit 28 can be turned on or off arbitrarily by an instruction from the system control unit 50. When the display is turned off, the power consumption of the image processing apparatus 100 can be significantly reduced. The image display unit 28 also displays information relating to focus, camera shake, shutter speed, aperture value, and exposure correction and the like in accordance with an instruction from the system control unit 50.

The memory 30 stores captured still images or moving images. The memory 30 is equipped with a storage capacity that is sufficient to store data of a predetermined number of still images or moving images of a predetermined time period. Thus, a large amount of image data can be written to the memory 30 at a high speed, even when conducting panoramic imaging or continuous imaging in which a plurality of still images are taken in succession. The memory 30 can also be used as a work area of the system control unit 50. Furthermore, the memory 30 is also used when reading out image data from a storage medium that is described later to the memory 30, performing processing to write the image data to the image display memory 24 via the image processing unit 20 and the memory control unit 22, and displaying the image data on the image display unit 28 using the display control unit 26.

The compression/expansion unit 32 compresses image data into, for example, JPEG data or expands compressed image data in accordance with a known compression method such as adaptive discrete cosine transform (ADCT). The compression/expansion unit 32 reads out an image stored in the memory 30 to perform compression processing or expansion processing. After finishing the processing, the compression/expansion unit 32 writes the data to the memory 30 again.

The shutter control unit 34 controls the operation of the shutter 12. The aperture control unit 40 controls the operation of the aperture 11. The shutter control unit 34 and the aperture control unit 40 also have a flash modulation function that is realized by cooperation with a flash 46. The focus control unit 42 controls focusing of the photographing lens 10. Reference numeral 46 denotes the flash. Reference numeral 48 denotes a flash control unit that controls light emission of the flash 46.

Reference numeral 50 denotes the system control unit that controls the overall operations of image processing apparatus 100. Reference numeral 52 denotes a memory that stores constants, variables, programs and the like for operation of the system control unit 50. Various kinds programs are stored in the memory 52, including a program that performs image capturing processing, a program that performs image processing, a program that records created image file data on a storage medium, and a program that reads image file data from the storage medium. The memory 52 also stores various programs such as an OS (operating system) for realizing and implementing a multi-task configuration for the foregoing programs. A message queue is generated for each program, and messages are accumulated in the message queue in a FIFO (First In First Out) fashion. The respective programs are controlled in relation to each other by exchanging the messages among the programs, to thereby realize control of the above-described functions.

Reference numerals 60, 62, 64 and 66 denote operation means for inputting various operation instructions to the system control unit 50. The operation means 60, 62, 64 and 66 comprise a single component or a combination of a plurality of components such as a switch, a dial, a touch panel, a device for pointing by line-of-sight detection, and a voice recognition device.

Hereunder, these operation means are described in further detail.

Reference numeral 60 denotes a mode dial switch that can switch the settings of various function modes including turning the power on or off, a reproduction mode, various image capturing modes, multi-screen reproduction/deletion mode, and a PC connection mode. In this connection, for example, an automatic image capturing mode, a programmed image capturing mode, a shutter-speed priority image capturing mode, an aperture priority image capturing mode, and a manual image capturing mode are available as image capturing modes. In addition, a portrait image capturing mode, a landscape image capturing mode, a close-up image capturing mode, a sports image capturing mode, and a night-view image capturing mode and the like may also be provided.

Reference numeral 62 denotes a release switch SW1 that is turned on when an unshown release button is pressed halfway, to instruct the start of processing such as AF processing, AE processing, AWB processing, and EF processing.

Reference numeral 64 denotes a release switch SW2 that is turned on when the unshown release button is fully pressed, to instruct the start of a series of processing including exposure processing, development processing, and recording processing. First, in the exposure processing, a signal read-out from the image sensor 14 is passed through the A/D converter 16 and the memory control unit 22 and is written as image data into the memory 30. Next, development processing is performed on the image data using calculations that are performed by the image processing unit 20 or the memory control unit 22. Subsequently, recording processing is performed by reading out image data from the memory 30, compressing the image data at the compression/expansion unit 32, and writing the image data on a storage medium 200.

Figure 3A:
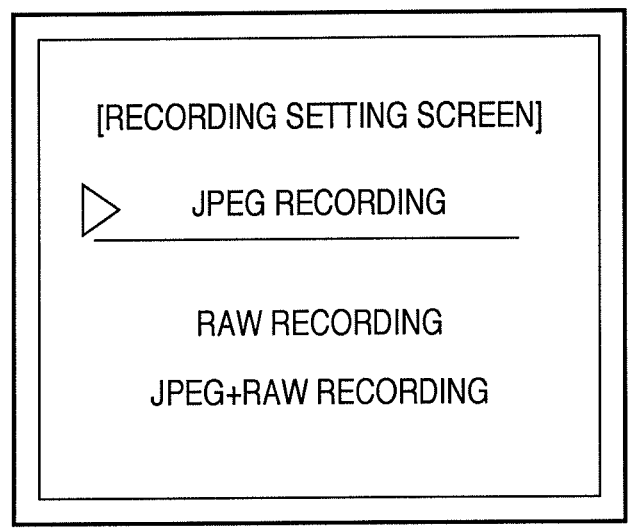
FIGS. 3A and 3B are views illustrating display examples of a recording setting screen according to the first embodiment.

Reference numeral 66 denotes a menu operation switch that comprises a combination of an unshown menu key, set key, and cross key and the like. The menu operation switch 66 allows a user to change various settings such as image capturing conditions and development conditions of the camera while viewing the image display unit 28. Further, according to the present embodiment, the menu operation switch 66 allows a user to make a JPEG image data file recording setting, a RAW image data file recording setting, or a setting to simultaneously record a JPEG image data file and a RAW image data file. The image data file recording setting that has been set is stored in the memory 30. FIG. 3A illustrates an example of a display that is displayed when making a recording setting. In this connection, it is assumed that the JPEG image data file recording setting causes image data files with the extension ".jpg" to be recorded on the storage medium, and the RAW image data file recording setting causes image data files with the extension ".raw" to be recorded on the storage medium.

Reference numeral 80 denotes a power control unit that includes a battery detection circuit, a DC-DC converter, and a switching circuit that switches the block to which power is supplied. The power control unit 80 detects whether or not a battery is mounted, the battery type, and the remaining battery power level. Based on the detected results and an instruction from the system control unit 50, the power control unit 80 controls the DC-DC converter to supply a necessary voltage to the respective parts including the storage medium for a necessary period.

Reference numeral 90 denotes an interface with a storage medium, such as a memory card and a hard disk. Reference numeral 92 denotes a connector for connection with the storage medium, such as a memory card and a hard disk.

In the present embodiment, one system of interface and connector for attachment of a storage medium is employed. However, the number of systems is not limited, and a single or plurality of systems of interfaces and connectors may be provided. Further, a combination of an interface and a connector which comply with different standards may be provided.

The interface and the connector may be configured to comply with standards for various storage media such as for a CF (compact flash (registered trademark)) card and a SD card. When the interface 90 and the connector 92 are configured so as to comply with the standard for a PCMCIA card or a CF (registered trademark) card, various communication cards can be connected. Examples of the communication cards include a LAN card, a modem card, a USB (Universal Serial Bus) card, and an IEEE (Institute of Electrical and Electronic Engineers) 1394 card. In addition, a P1284 card, an SCSI (Small Computer System Interface) card, and PHS and the like may be connected. By connecting these various communication cards, image data and management information attached to image data can be transferred to and from a computer or a peripheral device such as a printer. It is also possible to exchange information regarding whether or not a storage medium 200 that is described later is a storage medium that has a communication function. The aforementioned information also includes information regarding the extensions of data for which automatic transferring can be performed and the like.

The storage medium 200 may be a memory card, a hard disk, or the like that can be attached and detached to and from the image processing apparatus 100. The storage medium 200 includes a storage unit 202 that comprises a semiconductor memory, a magnetic disc, or the like, an interface 204 with the image processing apparatus 100, and a connector 206 that is used to connect the storage medium 200 with the image processing apparatus 100. A memory 203 is a region for reading out a data file that has been written to the storage unit 202. A communication control unit 205 can transfer data that is in the memory 203 while performing communication with an external device. A communication method at this time may be a common method or a special method. For example, a wireless LAN can be used. It should be noted that, according to the present embodiment it is assumed that the communication control unit 205 performs an operation to locate data with the extension ".jpg" that has been written in the storage unit 202 and reads out the data to the memory 203. More specifically, according to the present embodiment, it is assumed that data that can be automatically transferred by recording the data in the storage medium 200 is limited to data having the extension ".jpg". Naturally, the extension may be an extension other than ".jpg", or a configuration may be adopted in which data that have a plurality of different extensions are set as data that can be automatically transferred.

In this case, the following problem arises when an external storage medium is attached to the image processing apparatus 100. For example, when image data recorded by the image capturing apparatus is a JPEG image data file, simultaneously with the end of recording of the JPEG image data file, the JPEG image data file is automatically transferred from the external storage medium that has a communication function. Thus, the intention of the user that attached the external storage medium is reflected in the automatic transfer operation. In contrast, when the image data that is recorded is not a JPEG image data file, that is, when the extension is, for example, not ".jpg" and the file is a RAW image data file, the external storage medium does not perform automatic transfer of the RAW image data file. This operation is realized since the external storage medium determines whether or not to transfer files with the extension ".jpg", even if a RAW image data file has been recorded. Accordingly, if a RAW image file is recorded, automatic transfer of it is not performed, and the intention of the user that attached the external storage medium that has a communication function may not be reflected by an automatic transfer operation. More specifically, there is the problem that even though the user attaches a storage medium capable of communicating with the intention of transferring image data, because the setting for the recorded image data file is a RAW image data file and not a JPEG image data file, an automatic transfer operation is not performed.

Although RAW image data is described in the above example, the problem arisen with regard to RAW image data as described above can arise when various image data files that have different extensions such as moving image data are recorded.

Figure 2:
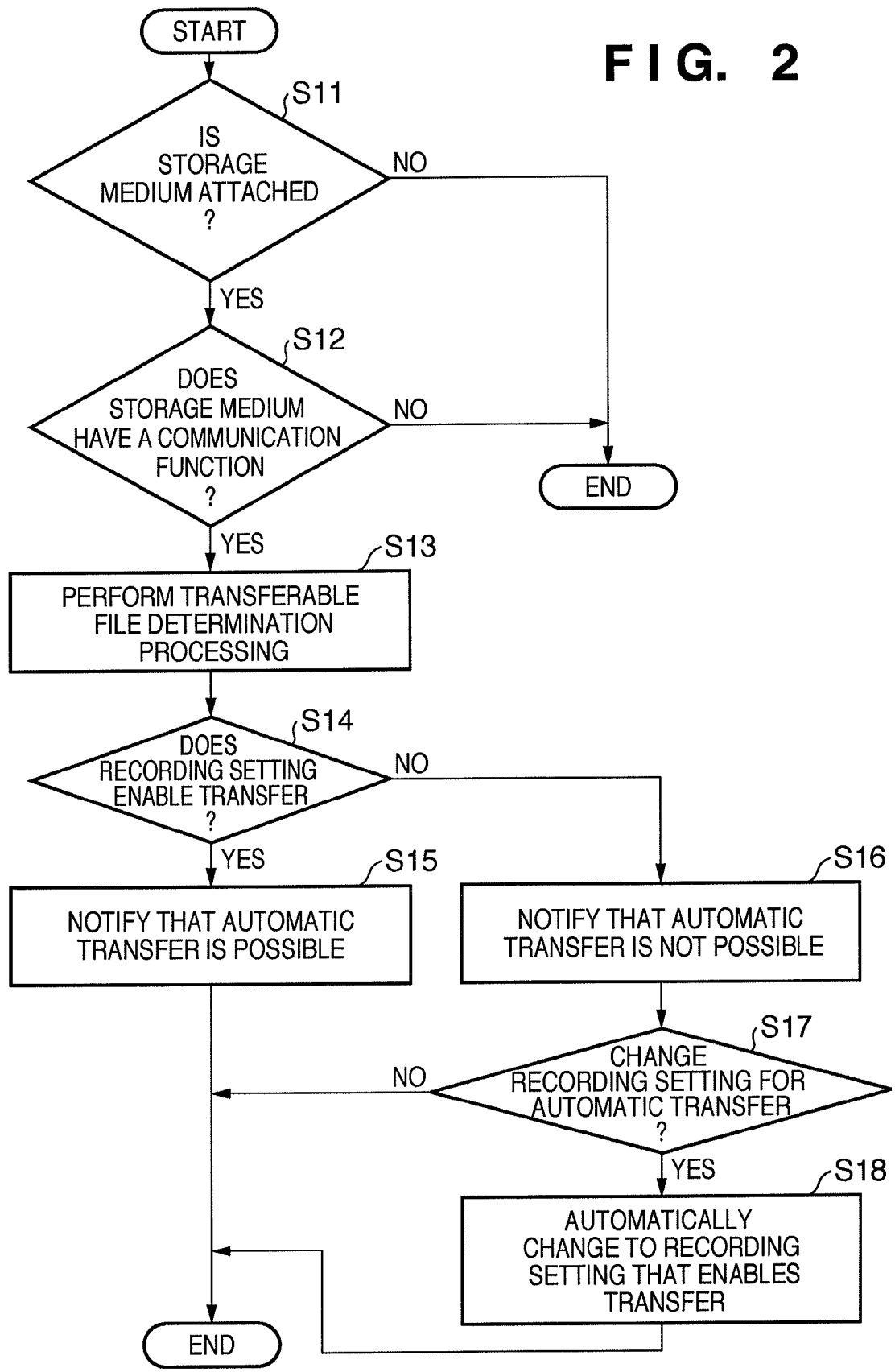
FIG. 2 is a flowchart for explaining automatic record-setting processing for images that can be transferred according to the first embodiment.

Next, automatic record-setting processing for images that can be transferred when an external storage medium having a communication function is attached to the image processing apparatus 100, that is a feature of the present invention, is described referring to FIG. 2. The processing illustrated in FIG. 2 is executed by the system control unit 50 performing control based on input information of various kinds.

First, the system control unit 50 determines whether or not a storage medium is attached to the interface 90 and connector 92 (S11). If it is determined that a storage medium is not attached, the system control unit 50 ends the processing. If it is determined that a storage medium is attached, the operation proceeds to S12 to determine whether or not the attached storage medium has a communication function. As described above, information regarding the presence or absence of a communication function can be acquired from the storage medium attached in the interface 90 and connector 92. If it is determined that the storage medium does not have a communication function, the system control unit 50 ends the processing. If it is determined that the storage medium does have a communication function, the operation proceeds to S13.

In S13, the storage medium 200 determines the recording format of files that can be transferred. As described above, according to the present embodiment it is assumed that the storage medium 200 does not transfer all data files that have been written, but rather can transfer only data files that have the extension ".jpg". In this case, the system control unit 50 can acquire from the storage medium 200, via the interface 90 and connector 92, information that indicates that data files having the extension ".jpg" can be transferred. Further, information to the effect that data files having the extension ".jpg" can be transferred by the storage medium 200 is stored in the memory 30.

Next, by means of the recording setting for image data files that is currently set, it is determined whether or not the extension of an image data file to be recorded on the storage medium 200 matches the extension that has been stored in the memory 30 in S13 (S14). According to the present embodiment, it is determined whether or not the extension is ".jpg", that is, it is determined whether or not the recording setting for image data files stored in the memory 30 is JPEG image data file recording. In this connection, the manner of performing a recording setting for an image data file using the menu operation switch 66 is as described previously with reference to FIG. 3A.

Figure 4A:
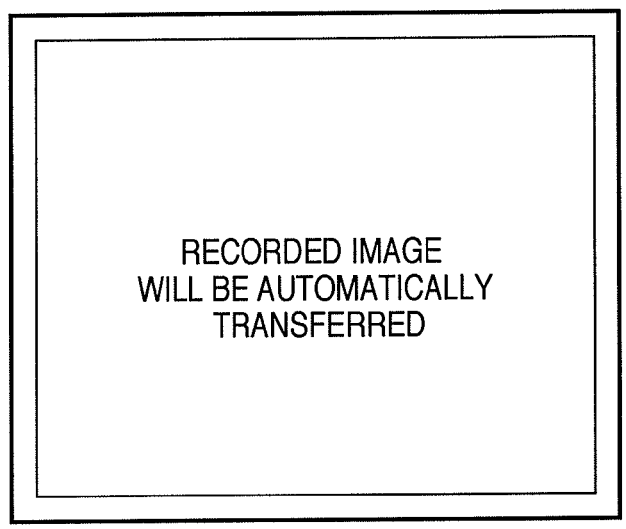
FIGS. 4A to 4C are views illustrating display examples of a notification screen according to the first and second embodiments.

If the recording setting for image data files is JPEG image data file recording, the operation advances to S15. In S15, automatic transfer possible notification processing is performed that displays a message to the effect that an automatic transfer can be executed from the storage medium 200, and thereafter the processing ends. FIG. 4A illustrates an example of an automatic transfer possible notification.

Figure 4B:
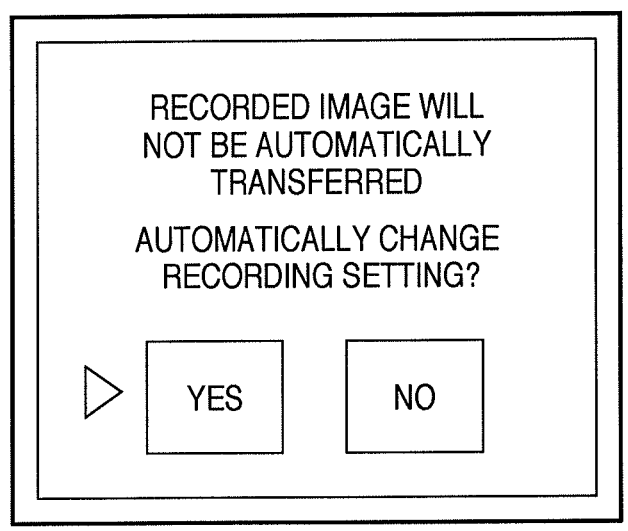

In contrast, if the recording setting for image data files is not a setting for recording JPEG image data files which the storage medium 200 can transfer, the operation advances to S16 to perform automatic transfer not possible notification processing (warning) that displays a message to the effect that automatic transfer cannot be performed from the storage medium 200. FIG. 4B illustrates an example of an automatic transfer not possible notification. In S16, not only is a message displayed that notifies the user that transfer is not possible, a display that allows the user to specify whether or not to automatically change the recording setting for image data files in order to perform an automatic transfer is also shown at the same time, and the specified setting is stored in the memory 30.

Figure 4C:
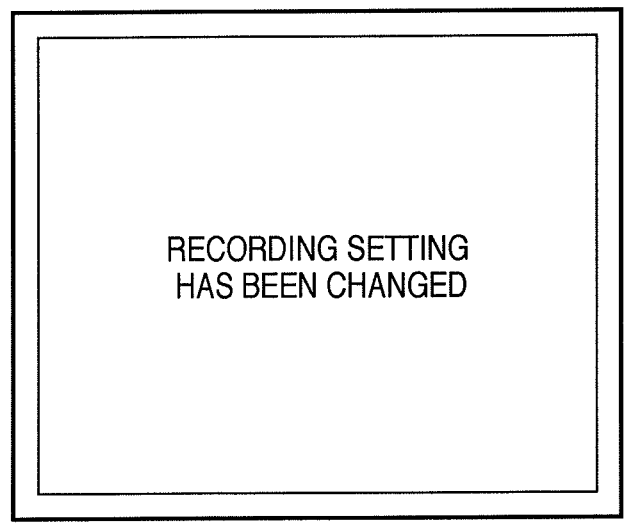

In S17, the system control unit 50 determines whether or not the user has specified to automatically change the recording setting stored in the memory 30. If the user has specified not to automatically change the recording setting, the system control unit 50 ends the processing. If it is determined that the user has specified to automatically change the recording setting, the operation proceeds to S18. In S18, the recording setting for image data files is automatically changed to JPEG image data file recording in order to execute an automatic transfer, and the recording setting is stored in the memory 30. In this connection, the recording setting for image data files may also be automatically changed to a JPEG image data file+RAW image data file simultaneous recording setting, and not just the JPEG image data file recording setting. More specifically, it is sufficient that a setting is made so that at least a JPEG image data file is recorded on the storage medium 200. Subsequently, display processing is performed to notify the user that this change has been performed (FIG. 4C), and thereafter the processing ends.

Figure 3B:
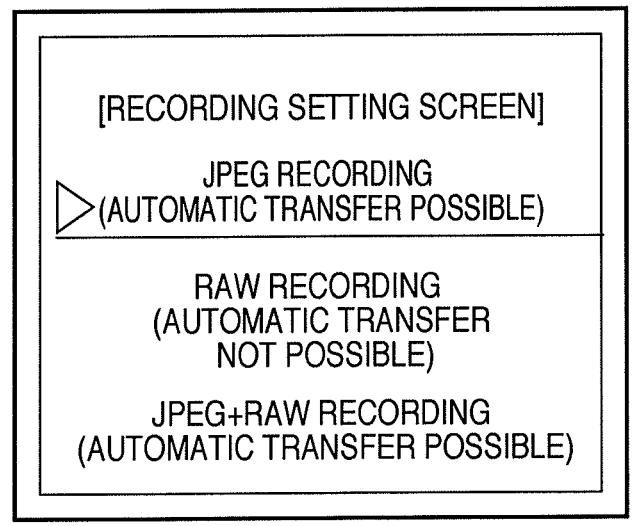

After executing the automatic change processing with respect to the recording setting for transferable images as described above, a screen as shown in FIG. 3B may be displayed instead of the recording setting screen shown in FIG. 3A. By displaying the screen shown in FIG. 3B, it is possible for the user to manually perform the recording setting again even after the recording destination has been automatically set. By means of the display shown in FIG. 3B, when the recording setting specified for the attached storage medium with a communication function is ".jpg", the user can know which kinds of recording settings are recording settings for which a transfer can not be performed. Naturally, a configuration may be adopted so that the user can not select a recording setting for which a transfer can not be performed.

Although according to the above embodiment a configuration is adopted such that the format of data that can be transferred by the storage medium with a communication function is acquired by communication with the storage medium, the present invention is not limited thereto.

For example, a configuration may be adopted in which a table is prepared that lists different types of storage media and the data formats that can be transferred by the respective types of storage media. According to such a configuration, the table is stored in advance in a memory inside the apparatus. As a result, the apparatus can recognize a transferable data format by acquiring information regarding the type of storage medium.

According to the first embodiment as described above, it is possible to make a recording setting for image data files that enables automatic transfer of an image data file that has been recorded on a storage medium with a communication function to be performed simply and reliably.

Second Embodiment

Figure 5:
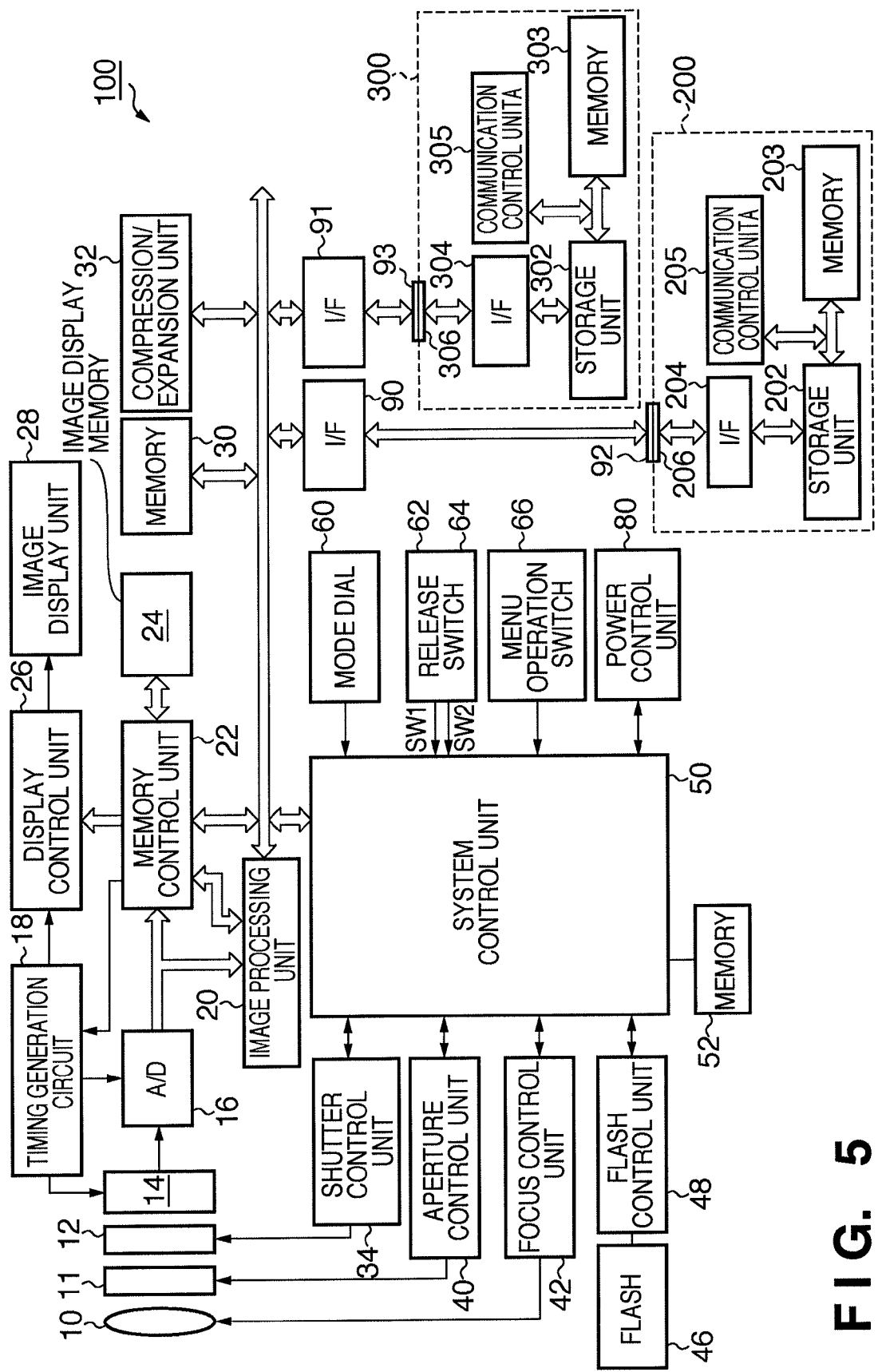
FIG. 5 is a block diagram illustrating a schematic configuration of an image processing apparatus according to the second embodiment.

Next, the configuration of an image processing apparatus according to a second embodiment of the present invention is described referring to FIG. 5. The configuration shown in FIG. 5 is the same as that of the image processing apparatus shown in FIG. 1, except that an interface 91 and a connector 93 are added to the configuration shown in FIG. 1. Thus, the configuration allows a user to attach a plurality of storage media (200 and 300) to the image processing apparatus. Since the remaining configuration is the same as in FIG. 1, a description thereof is omitted below.

Reference numeral 300 denotes a storage medium, such as a memory card and a hard disk. The basic configuration of the storage medium 300 is the same as that of the storage medium 200. The storage medium 300 includes a storage unit 302 that comprises a semiconductor memory, magnetic disc, or the like, an interface 304 with the image processing apparatus 100, and a connector 306 that connects with the image processing apparatus 100. A memory 303 is a region for reading out a data file that has been written on the storage unit 302. A communication control unit 305 can transfer data that is in the memory 303 while performing communication with an external device. It should be noted that, according to the second embodiment, similarly to the above described first embodiment, it is assumed that data that can be automatically transferred by recording the data in the storage medium 300 is limited to data having the extension ".jpg". Naturally, this extension may be an extension other than ".jpg", or a configuration may be adopted in which various kinds of data that have a plurality of extensions are set as data that can be automatically transferred.

Figure 7A:
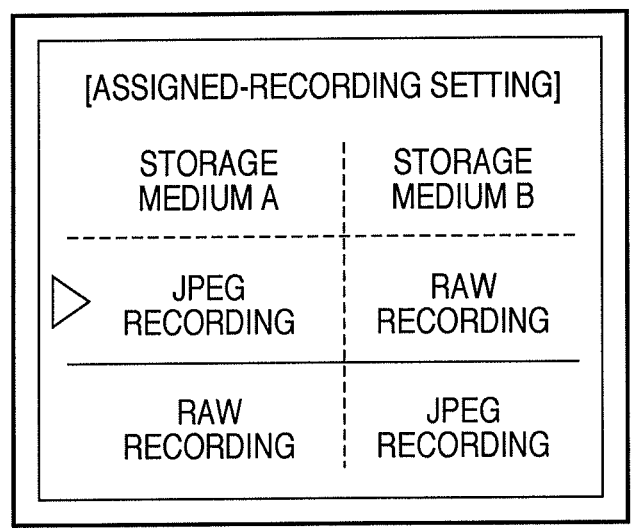
FIGS. 7A and 7B are views showing display examples of an assigned-recording setting screen according to the second embodiment.

According to the second embodiment, since it is possible to attach a plurality of storage media to the image processing apparatus 100 as described above, a user can arbitrarily perform a setting to assign and record which type of image data to be output to which type of storage medium. This assigned-recording setting is made by using a combination of the menu operation switch 66 and an unshown menu key, set key, and cross key, and the like. According to the present embodiment, it is assumed that the user can change various settings such as image capturing conditions or development conditions of the camera while viewing the image display unit 28. The assigned-recording setting that has been set is stored in the memory 30. FIG. 7A illustrates an example of a display when performing an assigned-recording setting. According to the second embodiment, it is assumed that, by means of the assigned-recording setting, JPEG image data files are recorded on one of the storage media and RAW image data files are recorded on the other of the storage media.

Figure 6A:
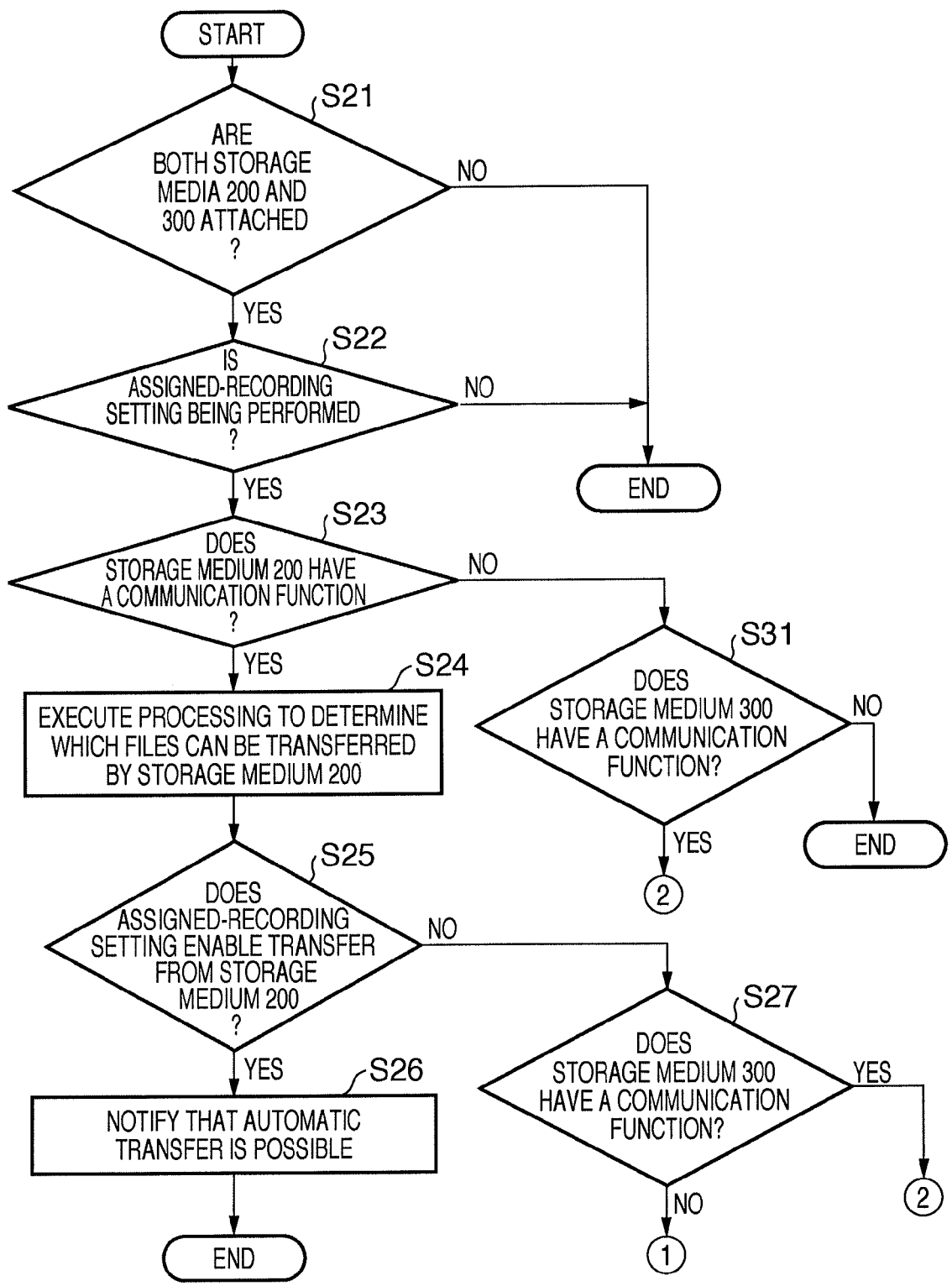
FIGS. 6A and 6B is a flowchart for explaining assigned automatic record-setting processing for images that can be transferred according to the second embodiment.
Figure 6B:
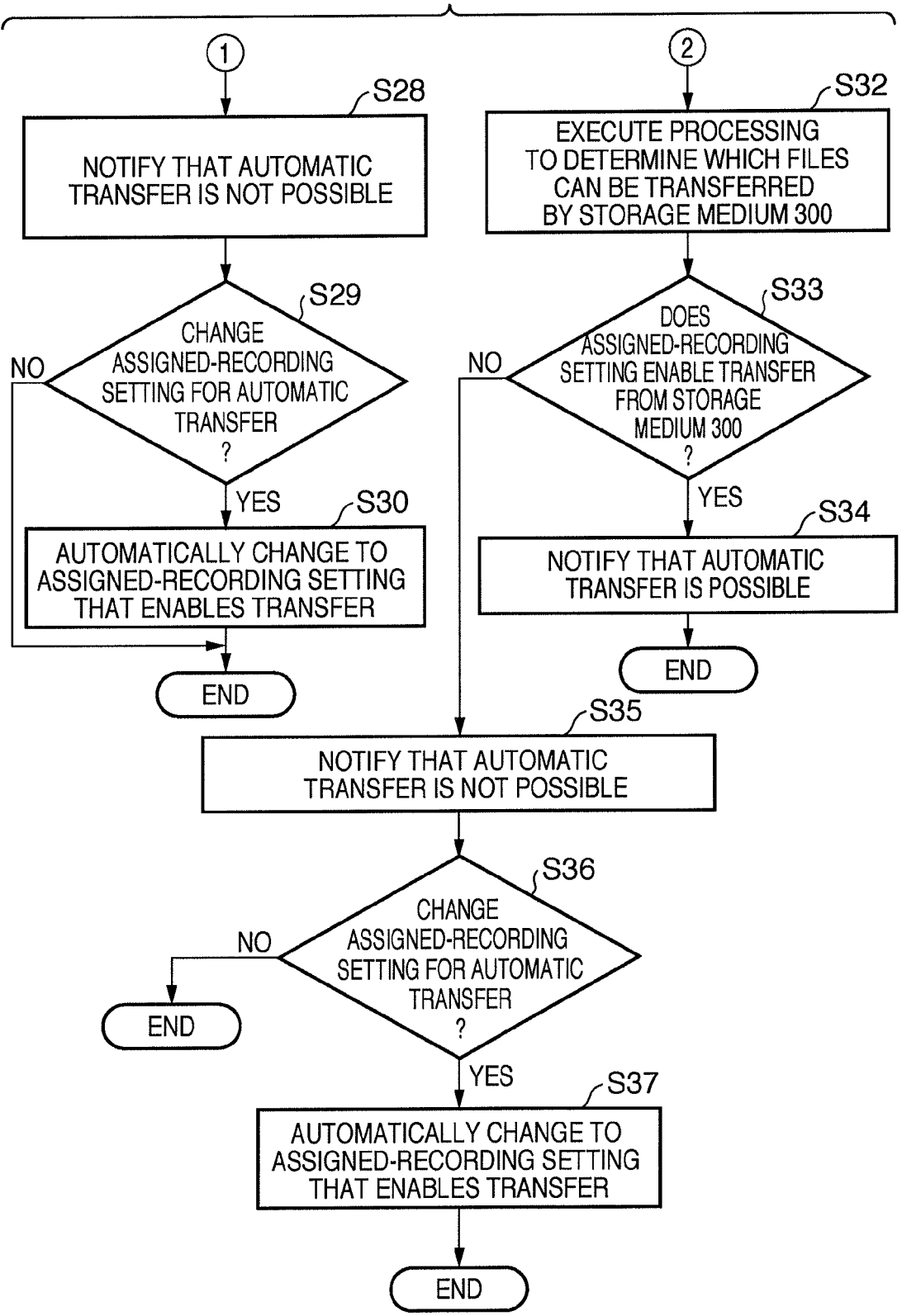

Next, referring to FIGS. 6A and 6B, a description is given of assigned automatic record-setting processing for transferable images that is performed when storage media are attached to the image processing apparatus 100 to which a plurality of storage media can be attached that is a feature of the second embodiment of the present invention. In the following description, irrespective of whether or not a storage medium has a communication function, for convenience, a storage medium that is attached to the interface 90 and connector 92 is referred to as "storage medium 200" and a storage medium that is attached to the interface 91 and the connector 93 is referred to as "storage medium 300". The processing shown in FIGS. 6A and 6B is executed by the system control unit 50 performing control based on input information of various kinds.

First, it is determined whether or not the storage media 200 and 300 are attached (S21). Since the feature of the present embodiment appears when a plurality of storage media are attached at the same time, if it is determined that either one of the storage media is not attached, the system control unit 50 ends the processing. If it is determined that both the storage media 200 and 300 are attached, the operation advances to S22 to determine whether or not an assigned-recording setting is being performed. Since the feature of the present embodiment appears when performing an assigned-recording setting, if it is determined that an assigned-recording setting is not being performed, the system control unit 50 ends the processing. If it is determined that an assigned-recording setting is being performed, the processing advances to S23 to determine whether or not the storage medium 200 has a communication function. As described above, information regarding the presence or absence of a communication function can be acquired from the storage medium 200 via the interface 90 and connector 92. If it is determined that the storage medium 200 does not have a communication function, the processing advances to S31. The processing in S31 and thereafter is described later.

If it is determined in S23 that the storage medium 200 has a communication function, the processing advances to S24 to determine the recording formats of files that can be transferred by the storage medium 200. According to the present embodiment, as described above, the storage medium 200 does not transfer all data files that are written thereto, but rather can transfer only data files that have the extension ".jpg". In this case, information to the effect that data files having the extension ".jpg" can be transferred can be acquired from the storage medium 200 via the interface 90 and connector 92. Subsequently, information indicating that data files having the extension ".jpg" are data files that can be transferred by the storage medium 200 is stored in the memory 30.

Next, by means of the assigned-recording setting for image data files that is currently set, it is determined whether or not the extension of an image data file to be recorded on the storage medium 200 matches the extension that has been stored in the memory 30 in S24 (S25). According to the present embodiment, it is determined whether or not the extension is ".jpg", that is, it is determined whether or not the assigned-recording setting for image data files stored in the memory 30 is an assigned-recording setting that records a JPEG image data file on the storage medium 200. In this connection, the manner of performing the assigned-recording setting for image data files using the menu operation switch 66 is as previously described referring to FIG. 7A.

If the assigned-recording setting for image data files is to record a JPEG image data file on the storage medium 200, the processing advances to S26. In S26, automatic transfer possible notification processing is performed that displays a message to the effect that automatic transfer from the storage medium 200 can be performed. Thereafter the processing ends. FIG. 4A illustrates an example of an automatic transfer possible notification.

In contrast, if the assigned-recording setting for image data files is not an assigned-recording setting that records a JPEG image data file on the storage medium 200, the processing advances to S27 to determine whether the storage medium 300 has a communication function. As described above, information regarding the presence or absence of a communication function can be acquired via the interface 91 and the connector 93 from the storage medium 300. If it is determined that the storage medium 300 has a communication function, the processing advances to S32. The processing of S32 and thereafter is described later.

In contrast, if it is determined that the storage medium 300 does not have a communication function, the processing advances to S28 to perform automatic transfer not possible notification processing (warning) that displays a message to the effect that automatic transfer cannot be performed from the storage medium 300. FIG. 4B illustrates an example of an automatic transfer not possible notification that is displayed in this case. In this connection, in S28, not only is a message displayed that notifies the user that transfer is not possible, but in addition a display that allows the user to specify whether or not to automatically change the assigned-recording setting in order to perform an automatic transfer is also shown at the same time. The setting (to make an automatic change or not) specified by the user is stored in the memory 30.

Next, in S29, the system control unit 50 determines whether or not the user has specified to automatically change the assigned-recording setting stored in the memory 30. If the user has specified not to automatically change the assigned-recording setting the system control unit 50 ends the processing. In contrast, if it is determined that the user has specified to automatically change the assigned-recording setting, the processing proceeds to S30.

In S30, since the storage medium 300 does not have a communication function, the system control unit 50 changes the assigned-recording setting so as to assign JPEG image data file recording to the storage medium 200 in order to perform an automatic transfer. More specifically, the assigned-recording setting for image data files is automatically changed to a setting that records JPEG image data files on the storage medium 200 and records RAW image data files on the storage medium 300, and this setting is stored in the memory 30. In this connection, the assigned-recording setting may also be automatically changed to a setting that simultaneously records a JPEG image data file and a RAW image data file on the storage medium 200 and that does not particularly change the recording to the storage medium 300. It is sufficient that the setting is one that records at least a JPEG image data file on the storage medium 200. Further, the system control unit 50 performs display processing to notify the user that this change has been performed (FIG. 4C), and then ends the processing.

Next, processing that is performed if it is determined that the storage medium 200 does not have a communication function is described (No in S23).

First, in S31, in a similar manner to S27, it is determined whether or not the storage medium 300 has a communication function. If the storage medium 300 does not have a communication function, it means that neither the storage medium 200 nor the storage medium 300 have a communication function, and therefore the processing ends.

In contrast, if it is determined that the storage medium 300 has a communication function, the processing advances to S32. In S32, the system control unit 50 determines what the recording format of files that can be transferred with the storage medium 300 is, and stores the result in the memory 30. According to the present embodiment, it is assumed that, similarly to the storage medium 200, the storage medium 300 can transfer only data files that have the extension ".jpg".

Next, by means of the assigned-recording setting for image data files that is currently set, it is determined in a similar manner to S25 whether or not the extension of an image data file to be recorded on the storage medium 300 matches the extension that has been stored in the memory 30 in S32 (S33).

If the assigned-recording setting for image data files is to record a JPEG image data file on the storage medium 300, the processing advances to S34. In S34, automatic transfer possible notification processing is performed that displays a message to the effect that automatic transfer from the storage medium 300 can be performed. Thereafter the processing ends. FIG. 4A illustrates an example of an automatic transfer possible notification.

In contrast, if the assigned-recording setting for image data files is not an assigned-recording setting that records a JPEG image data file on the storage medium 300, the processing advances to S35 to perform automatic transfer not possible notification processing (warning) that displays a notification to the effect that an automatic transfer can not be performed from the storage medium 300. FIG. 4B illustrates an automatic transfer not possible notification that is displayed in this case. In S35, not only is a message displayed that notifies the user that transfer is not possible, but in addition a display that allows the user to specify whether or not to automatically change the assigned-recording setting in order to perform an automatic transfer is shown at the same time. The setting (to make an automatic change or not) specified by the user is stored in the memory 30.

Next, in S36, the system control unit 50 determines whether or not the user has specified to automatically change the assigned-recording setting stored in the memory 30. If it is determined that the user has specified not to perform an automatic change, the processing ends. If it is determined that the user has specified to perform an automatic change, the processing advances to S37.

In S37, the assigned-recording setting is changed so as to assign JPEG image data file recording to the storage medium 300 in order to perform an automatic transfer. More specifically, the assigned-recording setting for image data files is automatically changed to a setting that records JPEG image data files on the storage medium 300 and records RAW image data files on the storage medium 200, and this setting is stored in the memory 30. In this connection, the assigned-recording setting may also be automatically changed to a setting that simultaneously records a JPEG image data file and a RAW image data file on the storage medium 300 and that does not particularly change the recording to the storage medium 200. It is sufficient that the setting is one that records at least a JPEG image data file on the storage medium 300. Further, the system control unit 50 performs display processing to notify the user that this change has been performed (FIG. 4C), and then ends the processing.

Figure 7B:
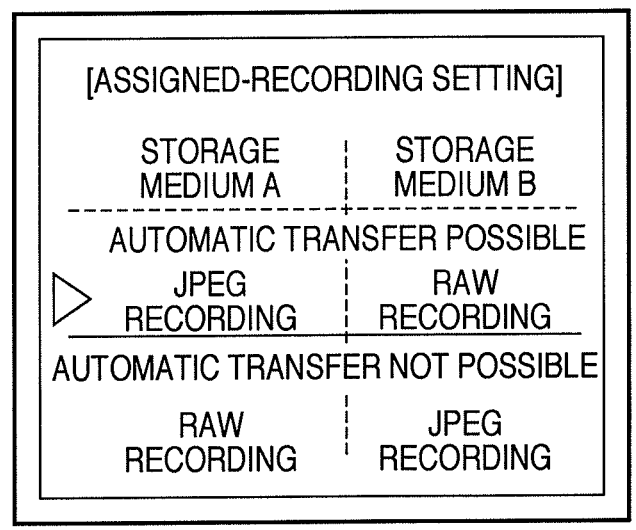

After executing assigned automatic record-setting processing for images that can be transferred as described above, instead of the assigned-recording setting screen shown in FIG. 7A, a screen is displayed that allows the user to recognize whether or not an automatic transfer will be performed for each of a plurality of assignment methods. A display as shown in FIG. 7B may also be shown. By displaying a screen as shown in FIG. 7B, it is possible for the user to manually perform the assigned-recording setting again even after a recording destination has been automatically set. By means of the display shown in FIG. 7B, the user can know which kinds of assigned-recording settings are set, a transfer cannot be performed. Naturally, a configuration may be adopted so that the user can not select an assigned-recording setting for which a transfer cannot be performed.

According to the second embodiment as described above, it is possible to perform an assigned-recording setting that enables the automatic transfer of an image data file that has been recorded on a storage medium with a communication function to be performed simply and reliably.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a storage medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-189578, filed on Aug. 18, 2009 which is hereby incorporated by reference herein in its entirety.

What is claimed is:

1. An image processing apparatus that records image data on a memory card, comprising:
a setting unit that sets a setting for recording before recording the image data on a memory card;
an attachment unit that attaches a memory card;
a determination unit that determines whether or not a memory card that is attached to the attachment unit has a communication function that communicates with a different apparatus than the image processing apparatus;
a recording unit that records the image data on the attached memory card in a recording format based on the setting for recording set by the setting unit; and
a control unit that controls the image processing apparatus to give notification to a user in a case where it is determined by the determination unit that the attached memory card has a communication function and that a recording format of image data that is compatible with a format for transference supported by the communication function of the attached memory card and the recording format that is based on the setting for recording set by the setting unit do not match.

2. The image processing apparatus according to claim 1, wherein the notification is to indicate that it is not possible to transfer the image data using the communication function of the attached memory card.

3. The image processing apparatus according to claim 1, wherein when the recording format of image data that is compatible with the format for transference supported by the communication function of the attached memory card does not match the recording format that is based on the setting for recoding set by the setting unit, said control unit controls the image processing apparatus to display a screen for changing the setting for recording that has been set by said setting unit to the setting for recording that is compatible with the format for transference supported by the communication function of the attached memory card.

4. The image processing apparatus according to claim 1 further comprising a display control unit that displays a selection screen for selecting setting for recording to be set by said setting unit,
wherein in the selection screen includes candidates of recording formats and information indicating whether or not each of the candidates is compatible with the format for transference supported by the communication function of the attached memory card.

5. The image processing apparatus according to claim 1, wherein the setting set by the setting unit includes recording in a RAW format and recording in a JPEG format.

6. The image processing apparatus according to claim 1, wherein the attached memory card that has the communication function includes a memory card that is configured to transfer image data in a PEG format and is not configured to transfer image data in a RAW format.

7. The image processing apparatus according to claim 3, wherein the setting unit is configured to change the setting to a setting that records image data both in a format that is compatible with the format for transference supported by the communication function of the attached memory card and in a format that that is not compatible with the format for transference supported by the communication function of the attached memory card via the screen for changing the setting for recording.

8. The image processing apparatus according to claim 4, wherein the candidates of recording formats include a format that is compatible with the format for transference supported by the communication function of the attached memory card and a format that that is not compatible with the format for transference supported by the communication function of the attached memory card.

9. The image processing apparatus according to claim 1, wherein the recording format that is compatible with the format for transference supported by the communication function of the attached memory card is acquired by communication with the attached memory card.

10. The image processing apparatus according to claim 1 further comprising a storage unit configured to store a type of the attached memory card that has the communication function and a recording format that is compatible with being transferred by the communication function of the attached memory card, in relation to each other.

11. An image processing method that records image data on a memory card that is attached to an attachment unit of an image processing apparatus, comprising:
setting a setting for recording before recording the image data on a memory card;

determining whether or not a memory card that is attached to the attachment unit has a communication function that communicates with a different apparatus than the image processing apparatus;

recording the image data on the attached memory card in a recording format based on the setting for recording set in the setting; and giving notification to a user in a case where it is determined in said determining that the attached memory card has a communication function and that a recording format of image data that is compatible with a format for transference supported by the communication function of the attached memory card and the recording format that is based on the setting for recording set in said setting do not match.

12. The image processing method according to claim 11, wherein the notification is to indicate that it is not possible to transfer the image data using the communication function of the attached memory card.

13. The image processing method according to claim 11, further comprising, when the recording format of image data that is compatible with the format for transference supported by the communication function of the attached memory card does not match the recording format that is based on the setting for recoding set in the setting step, displaying a screen for changing the setting for recording that has been set in said setting step to the setting for recording that is compatible with the format for transference supported by the communication function of the attached memory card.

14. The image processing method according to claim 11 further comprising displaying a selection screen for selecting the setting for recording to be set in said setting step, wherein in the selection screen includes candidates of recording formats and information indicating whether or not each of the candidates is compatible with the format for transference supported by the communication function of the attached memory card.

15. The image processing method according to claim 11, wherein the setting set in the setting step includes recording in a RAW format and recording in a JPEG format.

16. The image processing method according to claim 11, wherein the attached memory card that has the communication function includes a memory card that is configured to transfer image data in a MEG format and is not configured to transfer image data in a RAW format.

17. The image processing method according to claim 12, wherein the setting step is configured to change the setting to a setting that records image data both in a format that is compatible with the format for transference supported by the communication function of the attached memory card and in a format that that is not compatible with the format for transference supported by the communication function of the attached memory card via the screen for changing the setting for recording.

18. The image processing method according to claim 13, wherein the candidates of recording formats include a format that is compatible with the format for transference supported by the communication function of the attached memory card and a format that that is not compatible with the format for transference supported by the communication function of the attached memory card.

19. The image processing method according to claim 11, wherein the recording format that is compatible with the format for transference supported by the communication function of the attached memory card is acquired by communication with the attached memory card.

20. The image processing method according to claim 11 further comprising storing in a storage unit a type of the attached memory card that has the communication function and a recording format that is compatible with the format for transference supported by the communication function of the attached memory card, in relation to each other.

21. A non-transitory storage medium that stores a program for causing a computer to execute each step of the image processing method according to claim 11.

* * * * *